United States Patent [19]

Yoo

[11] Patent Number: 5,737,180

[45] Date of Patent: Apr. 7, 1998

[54] FERROELECTRIC CAPACITOR STRUCTURE

[75] Inventor: In-kyung Yoo, Kyungki-do, Rep. of Korea

[73] Assignee: Samsung Electronics Co., Ltd., Kyungki-do, Rep. of Korea

[21] Appl. No.: 541,772

[22] Filed: Oct. 10, 1995

[30] Foreign Application Priority Data

Aug. 1, 1995 [KR] Rep. of Korea ............ 95-23705

[51] Int. Cl.$^6$ ............ H01G 4/06; H01G 4/228; H01G 4/008; H01G 4/005

[52] U.S. Cl. ............ 361/313; 361/303; 361/305; 361/306.3; 361/320; 361/321.1; 361/321.5

[58] Field of Search ............ 365/145, 149; 257/295, 296, 310–311; 361/311–313, 320, 321.1, 321.2, 321.3, 321.4, 321.5, 322, 303, 305, 306.3

[56] References Cited

U.S. PATENT DOCUMENTS 5,587,870 12/1996 Anderson et al. ............ 361/313

*Primary Examiner*—Bot L. Ledynh
*Attorney, Agent, or Firm*—Seidel, Gonda, Lavorgna & Monaco, PC

[57] ABSTRACT

A ferroelectric capacitor structure variously having ceramic lower and upper electrodes, lower and upper insert layers, metal lower and upper electrodes, and a ferroelectric. The ceramic electrode(s) are variously connected with a writing terminal, and the metal electrodes are variously connected with a reading terminal. The use of a combination of metal and ceramic electrodes avoids both fatigue and leakage current.

6 Claims, 1 Drawing Sheet

FERROELECTRIC CAPACITOR STRUCTURE

BACKGROUND OF THE INVENTION

1. Field of the invention

The present invention relates, in general, to a novel ferroelectric capacitor structure and, more particularly, to a ferroelectric random access memory employing both metal and ceramic electrodes to avoid fatigue and leakage current, simultaneously.

2. Description of the Prior Art

The polarization loss of ferroelectric material, known as fatigue, usually occurs when the ferroelectric material is repetitively subjected to polarization reversal. This adversely affects the endurance of ferroelectric devices containing ferroelectric material, such as ferroelectric random access memory (FRAM).

To avoid various problems resulting from fatigue, a ferroelectric capacitor structure which employs a conductive ceramic electrode, instead of a metal electrode, has recently been suggested. The conductive ceramic electrode enables the ferroelectric device in which it is used to show improved endurance. However, leakage current is a more serious problem with conductive ceramic electrodes than with metal electrodes.

SUMMARY OF THE INVENTION

Fatigue can cause problems when recording data on FRAM, and leakage current can cause other problems upon reading information. The present inventor has found that, in FRAM, the problems associated with both fatigue and leakage current may be avoided by using a conductive ceramic electrode for writing and a metal electrode for reading. Indeed, after painstaking research, the present inventor has unexpectedly discovered that a ferroelectric capacitor which has a combination of metal and ceramic electrodes can significantly overcome the problems of fatigue and leakage current, simultaneously.

Accordingly, in one embodiment of the present invention, there is provided a ferroelectric capacitor structure having a ceramic lower electrode, a ferroelectric, a ceramic upper electrode, an insert layer, and a metal upper electrode which are laminated in sequence. The ceramic lower electrode and ceramic upper electrode are connected with the writing terminal and the ceramic lower electrode and metal upper electrode are connected with the reading terminal.

In another embodiment of the present invention, there is provided a ferroelectric capacitor structure having a ceramic lower electrode, a ferroelectric, a ceramic upper electrode, an insert layer, and a metal upper electrode which are, in sequence, formed on a metal lower electrode. The ceramic upper electrode and metal lower electrode are connected with the writing terminal, and the metal upper electrode and metal lower electrode are connected with the reading terminal.

In a further embodiment of the present invention, there is provided a ferroelectric capacitor structure having a lower insert layer, a ceramic lower electrode, a ferroelectric, a ceramic upper electrode, an upper insert layer, and a metal upper electrode which are, in sequence, formed on a metal lower electrode. The ceramic lower electrode and ceramic upper electrode are connected with the writing terminal, and the metal upper electrode and metal lower electrode are connected with the reading terminal.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
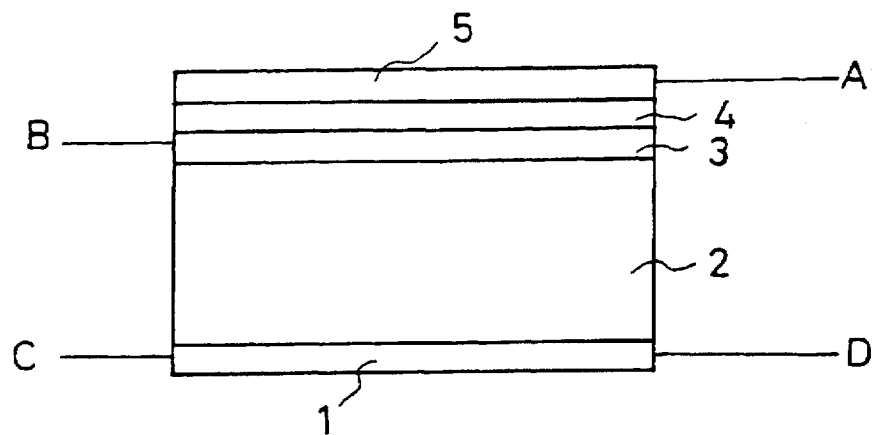
FIG. 1 is a schematic cross section of a ferroelectric capacitor structure according to one embodiment of the present invention.

Referring to the accompanying drawings, wherein like reference numerals indicate like and corresponding parts, there is shown in FIG. 1 a ferroelectric capacitor structure according to one embodiment of the present invention. As shown in FIG. 1, the structure includes a ceramic lower electrode 1, a ferroelectric 2, a ceramic upper electrode 3, an insert layer 4, and a metal upper electrode 5 which are sequentially laminated.

In this ferroelectric capacitor structure, the ceramic upper electrode 3 and the metal upper electrode 5 are connected with the writing terminal and the reading terminal, respectively, of a transistor, while the ceramic lower electrode 1 is connected with both the writing terminal and the reading terminal. For connection with the writing terminal, plate line B is utilized for the ceramic upper electrode 3, and bit line C for the ceramic lower electrode 1. For connection with the reading terminal, plate line A is utilized for the metal upper electrode 5, and sensor D for the ceramic lower electrode 1.

In this embodiment, current flows from the ceramic upper electrode 3, through the ferroelectric 2, and into the ceramic lower electrode 1, to write information. When reading information, current flows from the metal upper electrode 5, through the insert layer 4, the ceramic upper electrode 3, and the ferroelectric 2, and into the ceramic lower electrode 1.

The insert layer 4 is very important for determining the characteristic of the ferroelectric capacitor. For example, if the distance between the metal upper electrode 5 and the ceramic upper electrode 3 is too small, a tunnel effect may be generated, giving rise to increased leakage current. Therefore, the insert layer provided between the metal upper electrode and the ceramic upper electrode is formed of a material and has a thickness suitable to form a Schottky barrier. Available materials for the insert layer are para-dielectrics, high-dielectrics, and ferroelectrics, although other materials may be used. Lead-zirconate-titanate (PZT) with a thickness of around 800 Angstrom is preferable.

Figure 2:
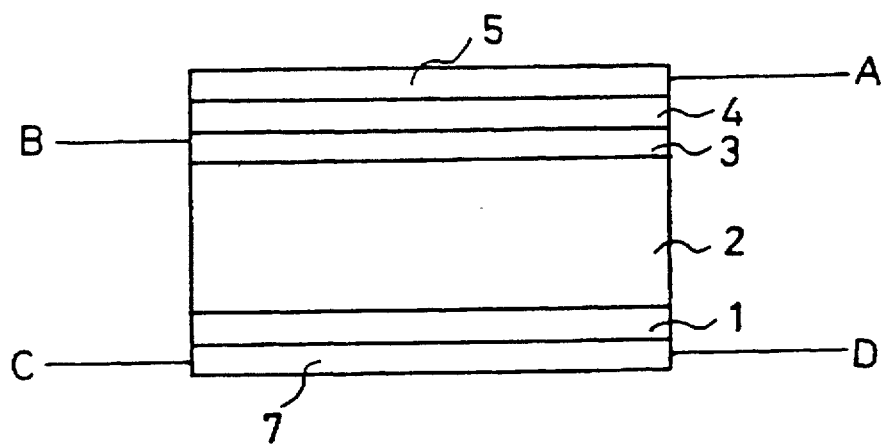
FIG. 2 is a schematic cross section of a ferroelectric capacitor structure according to another embodiment of the present invention.

FIG. 2 shows another embodiment of the present invention in which a metal lower electrode 7 is formed beneath the ceramic lower electrode 1. More specifically, the ferroelectric capacitor according to this embodiment has a structure in which the ceramic lower electrode 1, the ferroelectric 2, the ceramic upper electrode 3, the insert layer 4, and the metal upper electrode 5 are, in sequence, formed on the metal lower electrode 7.

In this structure, the ceramic upper electrode 3 and the metal upper electrode 5 are connected with the writing terminal and the reading terminal, respectively, of a transistor, while the metal lower electrode 7 is connected with both the writing terminal and the reading terminal. For connection with the writing terminal, plate line B is utilized for the ceramic upper electrode 3, and bit line C for the metal lower electrode 7. For connection with the reading terminal, plate line A is utilized for the metal upper electrode 5, and sensor D for the metal lower electrode 7.

Upon writing information, current in the ferroelectric capacitor structure flows from the ceramic upper electrode 3, through the ferroelectric 2, through the ceramic lower electrode 1, and finally into the metal lower electrode 7. To read stored information, current flows from the metal upper electrode 5 sequentially through the insert layer 4, the ceramic upper electrode 3, the ferroelectric 2, and the ceramic lower electrode 1, and into the metal lower electrode 7.

Figure 3:
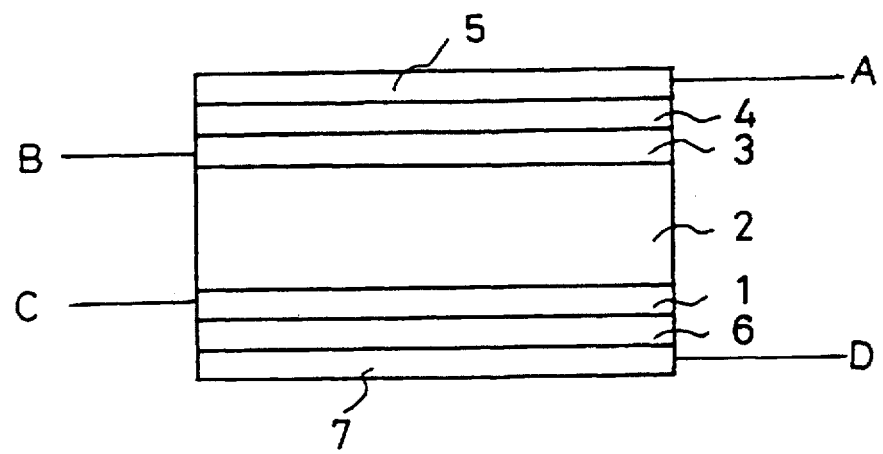
FIG. 3 is a schematic cross section of a ferroelectric capacitor structure according to a further embodiment of the present invention.

Referring now to FIG. 3, there is shown a ferroelectric capacitor structure according to a further embodiment of the present invention. The structure shown in this figure is similar to that shown in FIG. 2, with the exception that the ceramic lower electrode is separated from the metal lower electrode by an insert layer. More specifically, the ferroelectric capacitor structure according to this embodiment of the present invention is such that the lower insert layer 6, the ceramic lower electrode 1, the ferroelectric 2, the ceramic upper electrode 3, the upper insert layer 4, and the metal upper electrode 5 are, in sequence, formed on the metal lower electrode 7.

In this structure, the ceramic upper electrode 3 and the ceramic lower electrode 1 are connected with the writing terminal of a transistor, while the metal upper electrode 5 and the metal lower electrode 7 are connected with the reading terminal. For connection with the writing terminal, plate line B is utilized for the ceramic upper electrode 3, and bit line C for the ceramic lower electrode 1. In the case of the reading terminal, plate line A is utilized for the metal upper electrode 5, and the sensor D for the metal lower electrode 7.

Upon writing information, current in the ferroelectric capacitor structure according to a further embodiment of the present invention flows from the ceramic upper electrode 3, through the ferroelectric 2, and into the ceramic lower electrode 1. To read stored information, current flows from the metal upper electrode 5 sequentially through the upper insert layer 4, the ceramic upper electrode 3, the ferroelectric 2, the ceramic lower electrode 1, the lower insert layer 6, and into the metal lower electrode 7.

Like the upper insert layer 4, the lower insert layer 6 is provided between the ceramic lower electrode and the metal lower electrode to prevent the increase of leakage current. The lower insert layer may be formed from para-dielectrics, high-dielectrics, and ferroelectrics, although other materials may be used.

In sum, the ferroelectric capacitor structure of the present invention is so designed as to use ceramic electrode(s) for writing information and metal electrode(s) for reading information, to overcome the problem of fatigue. In addition, since metal and ceramic electrodes are used to read information in the capacitor structure of the present invention, leakage current can be reduced. Furthermore, when reading, since electrons flowing from the metal into the ceramic pass through the insert layer between the metal and ceramic, leakage current can be further reduced by virtue of the Schottky barrier formed in the insert layer.

Consequently, the ferroelectric capacitor structure according the present invention efficiently overcomes both fatigue and leakage current, the gravest problems of FRAM.

Other features, advantages, and embodiments of the present invention will be readily apparent to those exercising ordinary skill after reading the foregoing disclosure. In this regard, while specific embodiments of the invention have been described in considerable detail, variations and modification of these embodiments can be effected without departing from the spirit and scope of the invention as described and claimed.

What is claimed is:

1. A ferroelectric capacitor structure comprising a ceramic lower electrode, a ferroelectric, a ceramic upper electrode, an insert layer, and a metal upper electrode which are laminated, the ceramic lower electrode and the ceramic upper electrode being connected to a writing terminal, the ceramic lower electrode and the metal upper electrode being connected to a reading terminal.

2. A ferroelectric capacitor structure in accordance with claim 1, wherein the insert layer is formed from a material selected from the group consisting of para-dielectrics, high-dielectrics, and ferroelectrics.

3. A ferroelectric capacitor structure comprising a ceramic lower electrode, a ferroelectric, a ceramic upper electrode, an insert layer, and a metal upper electrode which are formed, in sequence, on a metal lower electrode, the metal lower electrode and the ceramic upper electrode being connected to a writing terminal, the metal lower electrode and the metal upper electrode being connected to a reading terminal.

4. A ferroelectric capacitor structure in accordance with claim 3, wherein the insert layer is formed from a material selected from the group consisting of para-dielectrics, high-dielectrics, and ferroelectrics.

5. A ferroelectric capacitor structure comprising a lower insert layer, a ceramic lower electrode, a ferroelectric, a ceramic upper electrode, an upper insert layer, and a metal upper electrode which are formed, in sequence, on a metal lower electrode, the ceramic lower electrode and the ceramic upper electrode being connected to a writing terminal, the metal lower electrode and the metal upper electrode being connected to a reading terminal.

6. A ferroelectric capacitor structure in accordance with claim 5, wherein the lower and upper insert layers are formed from materials selected from the group consisting of para-dielectrics, high-dielectrics, and ferroelectrics.

* * * * *